United States Patent
Dautartas et al.

[11] Patent Number: 5,841,544
[45] Date of Patent: Nov. 24, 1998

[54] METHOD FOR POSITIONING OPTICAL SUBASSEMBLY FOR TESTING

[75] Inventors: Mindaugas Fernand Dautartas, Alburtis; Edward A. Pitman, Grantville, both of Pa.

[73] Assignee: Lucent Technologies, Inc., Murray Hill, N.Y.

[21] Appl. No.: 764,958

[22] Filed: Dec. 13, 1996

[51] Int. Cl.$^6$ ............................ G01B 11/00; B23K 31/02; G02B 31/02; G02B 6/36; H05K 7/02

[52] U.S. Cl. .................... 356/399; 356/400; 228/180.21; 385/93; 29/834; 361/760

[58] Field of Search .................... 356/399–400; 228/180.21; 385/93; 29/834; 361/760

[56] References Cited

U.S. PATENT DOCUMENTS 5,257,336  10/1993  Dautartas ................................. 385/93
5,574,561  11/1996  Boudreau et al. ...................... 356/399

*Primary Examiner*—Frank G. Font
*Assistant Examiner*—Jason D. Vierra-Eisenberg
*Attorney, Agent, or Firm*—David L. Smith

[57] ABSTRACT

There is disclosed a method of positioning an optical subassembly for testing includes positioning an optical subassembly within a capture zone on a support surface of a test fixture. At least two probes engage surfaces of respective ones of precisely located fiducials in a surface of the optical subassembly. A third probe contacts a surface of the optical subassembly, which in a preferred embodiment may be another fiducial in the surface of the optical subassembly. Upon engagement of the probes with surfaces of respective fiducials and movement of the probes further into respective fiducials, the optical subassembly is translated into more precise alignment with optics of the test fixture.

15 Claims, 3 Drawing Sheets

5,841,544

METHOD FOR POSITIONING OPTICAL SUBASSEMBLY FOR TESTING

TECHNICAL FIELD

This invention relates to testing an optical subassembly, and in particular to precisely positioning the optical subassembly relative to optics in a test fixture for testing.

BACKGROUND OF THE INVENTION

Optical subassemblies on which a laser and photodiode, and possibly a lens, are mounted must be tested after being assembled to assess the quality of the laser emissions. A determination is made whether components of the optical subassembly meet specifications. If the optical subassembly meets specifications, it can be used farther up in the value chain. If it does not meet specifications, it is rejected before additional value is added. To test an optical subassembly, the optical subassembly must be positioned relative to optics on a test fixture such that the laser emissions, when the optical subassembly is powered, are received by optics of the test fixture.

Testing an optical subassembly requires constraining many degrees of freedom. The optical subassembly must be aligned to an optical axis to within ±1 mil in three degrees of freedom X, Y and Z. The optics on the test fixture may be any test optics set and includes a fiber, the end of which must be aligned to ±0.5 microns in three degrees of freedom X, Y and Z and the axis of which must be angularly aligned with the optical subassembly in three degrees of freedom $\leq_X$, $\leq_Y$, and $\leq_Z$. The number of degrees of freedom that must be aligned totals nine. While the testing operation is important, alignment for testing is ephemeral in that once the optical subassembly is tested, the subassembly is removed from the test fixture, and replaced by another optical subassembly for testing.

One known method of aligning an optical subassembly with optics of a test fixture includes clamping the optical subassembly to a support surface in close proximity to the test fixture and aligning all of the components to the subassembly. The support surface, with the optical subassembly secured thereto, remains stationary while the test fixture and optics, including electrical probes and optical fiber, mounted thereto are repositioned until alignment is achieved. One problem with this method is that once the optical subassembly is secured to the support surface, electrically conductive probes engage metalized regions (bonding pads) on the optical subassembly to energize the laser and diode. With the laser energized, feedback control circuits are used to assist in and evaluate the success of the alignment process. Typically, separate repositioning processes using feedback are used to optimize positioning of the components. Thus, control of the initial mechanical positioning of the optical subassembly on the support surface must be sufficiently precise to permit probes to be positioned to engage the metalized regions on the optical subassembly so the feedback circuit can then be utilized to further refine the relative positions of the optical subassembly and the optics of the test fixture.

SUMMARY OF THE INVENTION

In accordance with an illustrative embodiment of the invention, a method of positioning an optical subassembly for testing includes positioning an optical subassembly within a capture zone on a support surface of a test fixture. At least two probes engage surfaces of respective ones of precisely located fiducials in a surface of the optical subassembly. A third probe contacts a surface of the optical subassembly, which in a preferred embodiment may be another fiducial in the surface of the optical subassembly. Upon engagement of the probes with surfaces of respective fiducials and movement of the probes further into respective fiducials, the optical subassembly is translated into more precise alignment with optics of the test fixture.

DETAILED DESCRIPTION

Figure 1:
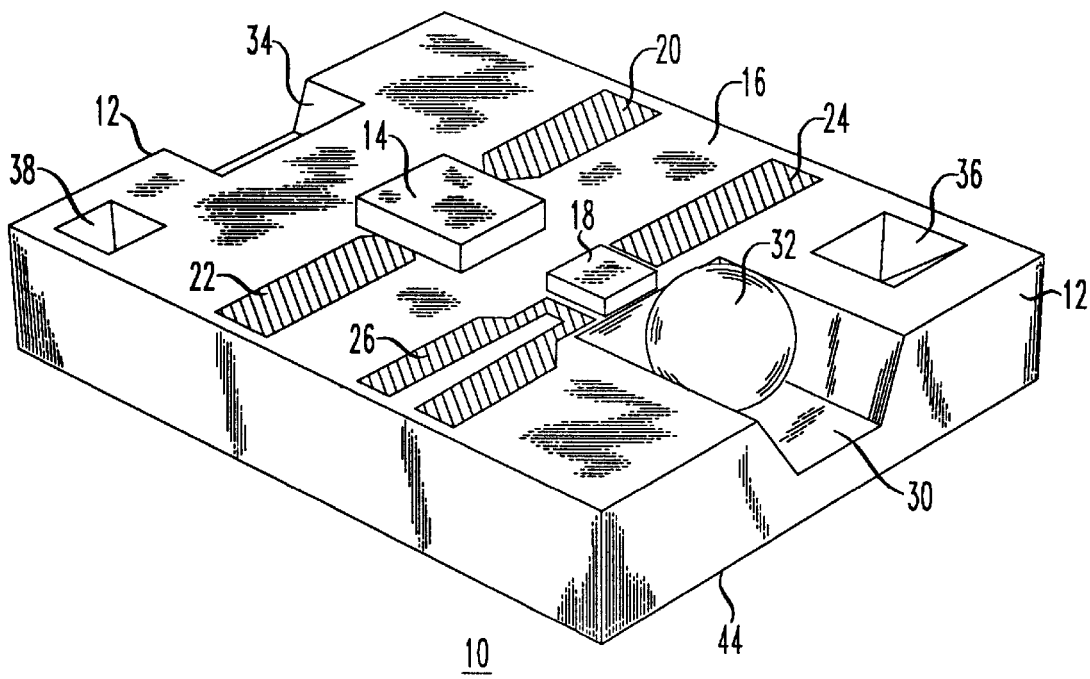
FIG. 1 illustrates an optical subassembly that can be aligned with optics of a test fixture in accordance with the method of the present invention.

FIG. 1 illustrates an optical subassembly 10 that can be aligned with optics of a test fixture for testing in accordance with the method of the present invention. Optical subassembly 10 includes platform 12 which is used to support active optical devices and provide electrical connections thereto. Photodiode 14 is mounted on first surface 16 of platform 12 to receive light emitted from the rear facet of laser 18, which is also mounted on first surface 16 of platform 12. Metalized regions 20 and 22 on first surface 16 are electrically coupled to photodiode 14 to conduct electrical energy to energize photodiode 14 in a final assembly, as well as during testing. Similarly, metalized regions 24 and 26 on first surface 16 are electrically coupled to laser 18 to conduct electrical energy to laser 18 in a final assembly (not shown) as well as during testing.

Platform 12 is preferably silicon, however, platform 12 may be any suitable material, including but not limited to silicon, which may be processed to include the various features (i.e., alignment fiducials or cavities) with the accuracy to be used in providing optical alignment. First surface 16 includes an elongate alignment fiducial 30 for receiving and positioning spherical lens 32. First surface 16 also includes fiducial 34 which may be formed as a portion of elongate alignment fiducial 30 of a platform in an adjacent cell. When the cells are diced into individual platforms 12, a portion of the etched feature forms a fiducial on each of two platforms. Additional fiducials, such as fiducials 36 or 38, may be included in first surface 16 of platform 12. As is known in the art, lens 32 is precisely positioned in fiducial 34 by engagement with various surfaces 58 of fiducial 34. Lens 32 may be secured in its aligned position in fiducial 34, such as by alloy bonding, a thermocompression bond.

Figure 3:
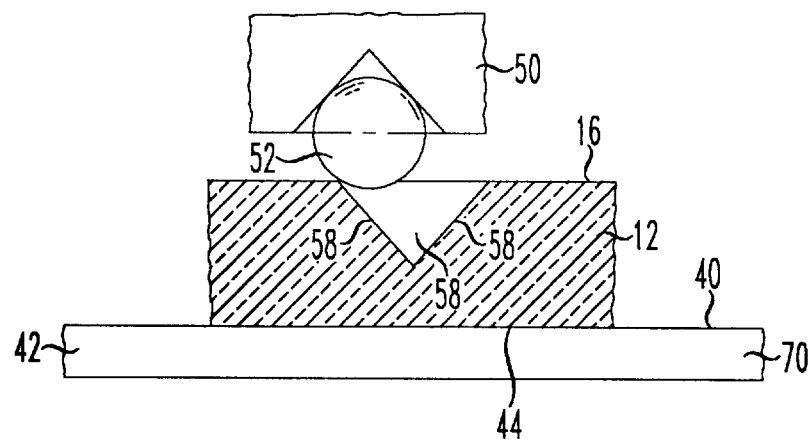
Figure 4:
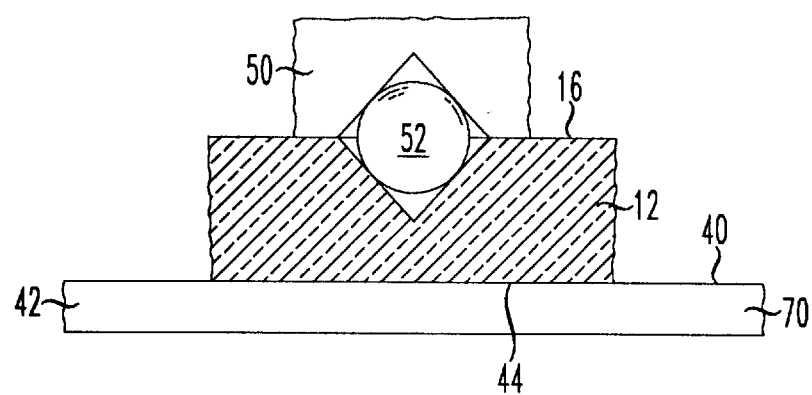

Positioning of platform 12, having fiducials such as fiducials 30, 34, and 36, relative to optics in a test fixture will be described with reference to the three figure action sequence of FIGS. 2, 3, and 4. In the testing process, platform 12 is placed on support surface 40 of a test fixture 42 with second surface 44 of platform 12 in engagement with support surface 40, and with platform 12, and more particularly lens 32, in close proximity of optics of the test fixture. Optical subassembly 10 is positioned on a base 70 (see FIG. 6) within a capture zone of tolerances, dependent on the dimension of the fiducials and probe tips to be received therein. The capture zone defines an outer position where the profile of fiducials relative to the profile of probe tips will permit the probe tips to move platform 12 into alignment upon the probe tips moving into engagement with the respective fiducials. Should subassembly 10 be positioned outside the capture zone, platform 12 can not be aligned by engagement of probe tips with the fiducials. Alignment is not possible because the probe tips are beyond a position where they would co-act with surfaces of the fiducials to achieve alignment upon being moved into engagement with platform 12.

Figure 2:
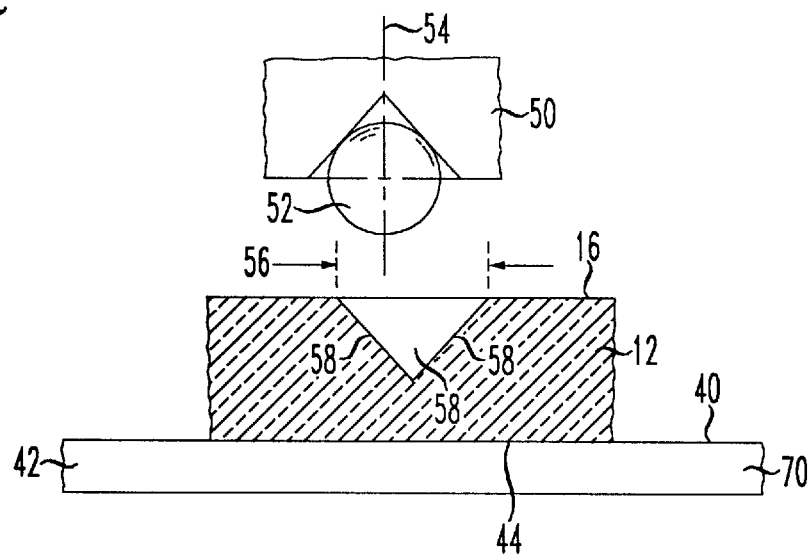
FIGS. 2, 3, and 4 are an action sequence of a probe engaging a fiducial in a platform of an optical subassembly, and the platform translating relative to the probe, in accordance with the present invention.

The end of a probe 50 having, for example, a spherical tip 52, a hemispherical portion of which is positioned to cooperate with fiducials, is shown in FIG. 2 positioned above a cross-section of a portion of platform 12 in the region of a fiducial. Probe 50 is part of test fixture 42 shown in FIG. 5. Spherical tips are preferred because they can be made very accurately and can be aligned very accurately along a center line of a probe such as silicon. Optical subassembly 10 is positioned on support surface 40 with sufficient accuracy that center line 54 of tip 52 falls within the capture region 56 of the associated fiducial. Support surface 40 is a smooth surface and may be made of any material, for example brass or steel. The fiducial illustrated is fiducial 36 but is representative of the other fiducials. The capture region 56 is an upward projection of the outer periphery of a fiducial in first surface 16 of platform 12.

Probe 50 and platform 12 are moved toward each other such that tip 52 tangentially engages one or more of the tapered surfaces 58 of the fiducial. Either probe 50 or platform 12, or both, may be moved. Once tip 52 and one or more surfaces 58 have engaged, further movement of probe 50 or platform 12 toward each other causes platform 12 to translate, with second surface 44 sliding along support surface 40. The reaction force between tip 52 and one or more surfaces 58 overcomes the frictional force between second surface 44 of platform 12 and support surface 40 of test fixture 42. Translation occurs in the two degrees of freedom of surfaces 40 and 44 until the fiducial is centered relative to tip 52, as shown in FIG. 4. In this position, tip 52 may engage one or more surfaces 58 such as, one, two, three or four surfaces 58, of a fiducial depending on the size and slope of the fiducials and tips. Also in this position, platform 12 is precisely positioned relative to the probe or probes.

Three points of contact are typically made with platform 12 to assure it is in a plane, oriented in the desired orientation, and precisely positioned with laser 18 optically aligned with optics on the test fixture. This may be achieved with three probes 50 having spherical tips 52 received in respective ones of a corresponding number of fiducials in platform 12. Two probe tips 52 may be received in a single fiducial, such as is shown in fiducial 34 in FIG. 5. Alternatively, two probes 50 having spherical tips 52 received in respective ones of two fiducials in platform 12, coupled with knowledge of the location of the plane of support surface 40 and the thickness of platform 12, would suffice to precisely position platform 12 resulting in optical alignment between laser 18 and optics on the test fixture. Yet another alternative embodiment would provide a compliant support surface 40 that is movable, in the vertical direction as illustrated in FIGS. 2, 3, and 4, such as by being supported by springs. The spherical tip 52 of two probes 50 would be received respectively in two fiducials in platform 12, with the spherical tip of a third probe 72 having tip 52 (see FIG. 6) engaging a surface of platform 12, such as first surface 16, to assure that platform 12 is in a plane oriented in the desired orientation. In this manner, platform 12 is precisely positioned and aligned in nine degrees of freedom with laser 18 optically aligned with optics on the test fixture.

Figure 5:
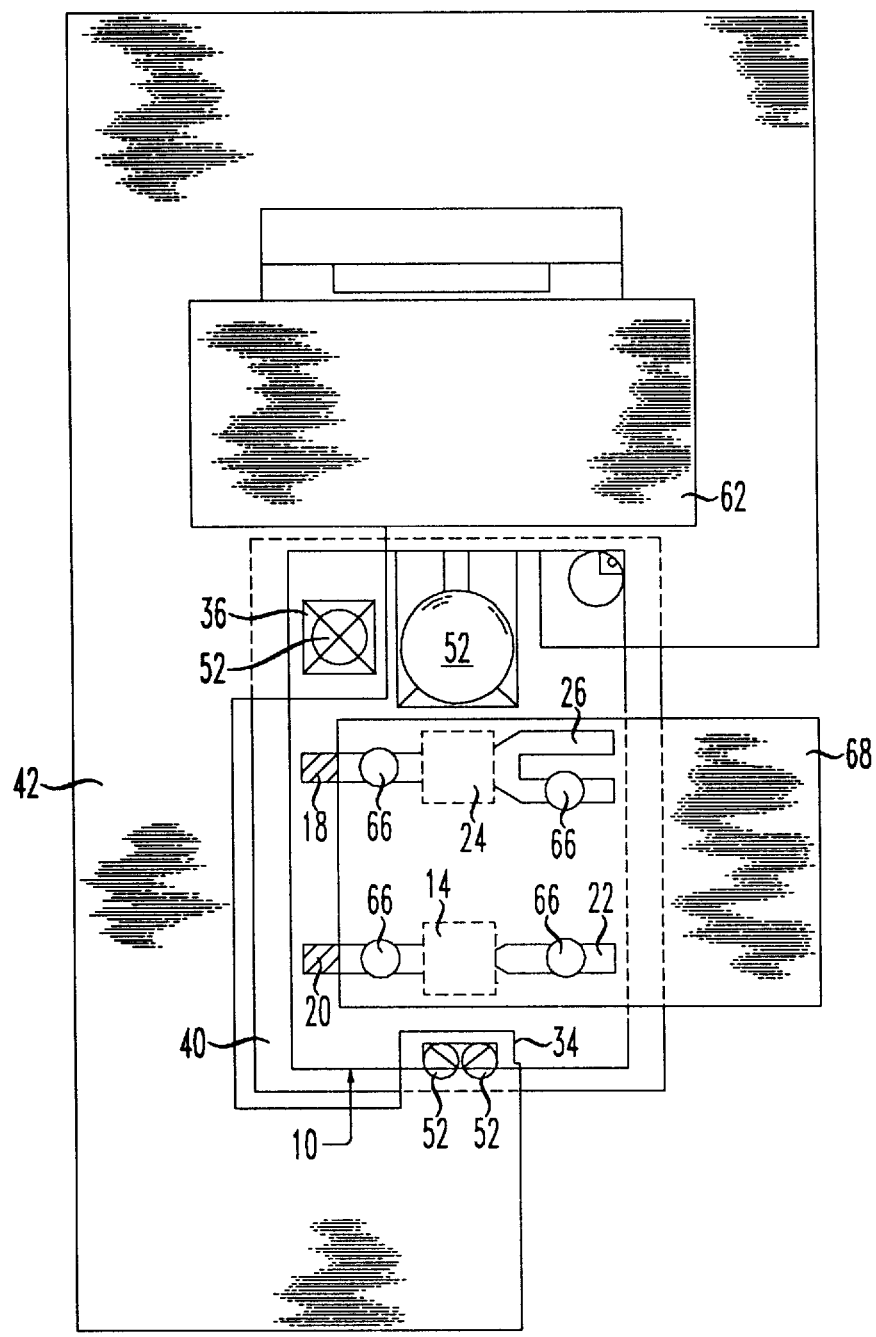
FIG. 5 illustrates the test fixture positioned over an optical subassembly with electrical contacts engaging metalized regions on the optical subassembly.

FIG. 5 shows a top view of a test fixture 42 including optics 62. The optics 62 in the test fixture 42 could be any test set of optics. With two probe tips 52 received in and engaging surfaces 58 of fiducials 34 and one probe tip received in and engaging surfaces of fiducial 36, platform 12 is precisely positioned and aligned with optics 62 in nine degrees of freedom with laser 18 optically in test fixture 42. Contacts 66, which may be compliant, on probe card 68 are moved into engagement with metalized regions 22, 26 and 28 to provide energy from probe card 68 to energize laser 18 or photodiode 14 or both. Laser 18 emits light into lens 32, which expands and collimates the beam of light. The collimated beam is directed towards optics 62 and may pass through other lenses or isolators. The fiber 74 (see FIG. 6) is then aligned in three dimensions to the beam emitted by the laser 18, using known micropositioning feedback processes and devices. The quality of the laser emissions received by optics 62 and test fixture 60 are evaluated. This facilitates evaluating such parameters as power out, frequency response and bit error rate. Other characteristics may also be evaluated. A determination is made, by beam analyzing equipment 76 associated with the test fixture that analyze the optical output, whether the components mounted on platform 12 are within specification. An indication is made whether the quality of the laser emissions (optical output) meets the specifications and the subassembly can be used farther up in the value chain, or the quality of the laser emissions does not meet specifications and the subassembly should be rejected before further value is added. Probe card 68 is removed and probe tips 52 are retracted. Platform 12 is removed from support surface 40 of test fixture 42, and another platform is positioned on support surface 40 for more precise positioning and testing.

Figure 6:
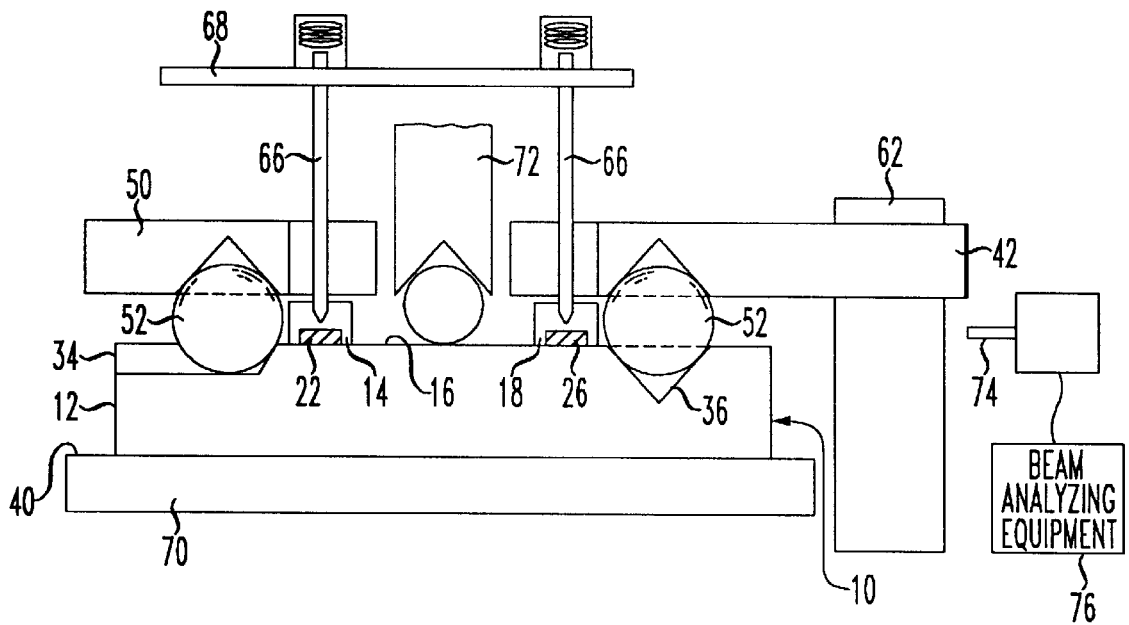
FIG. 6 illustrates a side view of a portion of the test fixture of FIG. 5, with electrical contacts engaging metalized regions of the optical subassembly.

FIG. 6 shows a side view of test fixture 42, including optics 62. Various drive devices and the feedback control systems are not shown for clarity. Probe tips 52 are received in respective fiducials 34 and 36. Compliant contacts 66 are mounted on probe card 68 such that when they engage respective metalized regions on first surface 16, and the test fixture and platform 12 move toward each other, the contacts 66 engage the metalized regions and remain in engagement with the metalized regions but retract relative to probe card 68.

In positioning test fixture 42 through the various drive devices, one or more probes may be used to sense the position of test fixture 42. As described above, a fiber 74 is positioned proximate platform 12 to receive the light emitted by laser 18, as directed by lens 32. Fiber 74 is coupled to beam analyzing equipment 76, as is known in the art.

With contacts 66 part of the test fixture indexed to engage metallized regions on platform 12 to power-up laser 18 during testing, electrical parameters are reproducible. For example, when the contacts engage metallized regions during testing, there are stray capacitances and inductances that effect performance of the laser being tested. Using the method of the present invention positions the contacts at the same location on metallized regions of the platform for each optical subassembly tested, reducing variations in stray capacitances and inductances which improves testing reproducibility.

While the invention has been described as having a probe with a spherical tip, the invention is not limited thereto. The probe tip could be tapered toward a distal end, such as for tangential engagement. If centering is desired relative to a fiducial, such as a pyramidal-shaped fiducial, rotational symmetry of the probe tip may be desired.

The invention provides the advantage of simplifying the alignment of a platform with optics in a test fixture by relying on a mechanical positioning of the platform rather than requiring complex feedback control systems to manipulate and position the platform.

The invention claimed is:

1. A method of precisely aligning optical components disposed on an optical subassembly with optics of a test fixture, the test fixture including at least an optical fiber and defined as comprising an optical axis, the method comprising the steps of:

positioning the optical subassembly within a capture zone on a support surface of the test fixture;

engaging a least two test fixture probes in contact with surfaces of respective ones of a corresponding number of precisely located fiducials in a surface of the optical subassembly;

translating the optical subassembly into more precise alignment with optics of the test fixture by moving at least two probes further into the respective fiducials;

engaging a third probe in contact with a surface of the optical subassembly such that the optical subassembly is spatially aligned along the X, Y, and Z axes with respect to the test fixture optical axis and the test fixture optical fiber is angularly aligned along $\Theta_x$, $\Theta_y$, and $\Theta_z$ with respect to the optics of the optical subassembly; and wherein a metalized region is located on the optical subassembly for energizing the component on said optical subassembly.

2. The method as recited in claim 1, wherein the step of engaging a third probe comprises engaging a third probe in contact with a precisely located fiducial in a surface of the optical subassembly.

3. The method as recited in claim 1, further comprising the step of energizing said metalized region on the optical subassembly to energize said component on the optical subassembly.

4. The method as recited in claim 3, wherein the step of energizing said metalized region on the optical subassembly further comprises the steps of:

moving a contact into engagement with said metalized region on the optical subassembly; and passing energy through the contact to energize the metalized region, whereby said component on the optical subassembly is energized.

5. The method as recited in claim 3, further comprising the step of assessing the quality of the emissions from the energized component.

6. The method as recited in claim 5, further comprising the step of de-energizing the metalized region on the optical subassembly.

7. The method as recited in claim 5, further comprising the step of indicating acceptance or rejection of the optical subassembly under test based on the assessed emissions.

8. The method as recited in claim 1, wherein the step of translating comprises moving the optical subassembly relative to the support surface of the test fixture.

9. The method as recited in claim 8, wherein the support surface remains stationary and the optical subassembly moves relative to the support surface.

10. A method of precisely aligning optical components disposed on an optical subassembly with optics of a test fixture for testing of the optical subassembly, the test fixture defined as comprising an optical axis, having a support surface on which the optical assembly is placed, an optical fiber to be aligned with the optical subassembly and at least three probes to engage the optical subassembly, the optical subassembly having fiducials to cooperate with the at least three probes and at least one metalized region to conduct energy to at least one component thereon, the method comprising the steps of:

moving the optical subassembly and probes toward each other;

engaging the probes with surfaces of the fiducials;

translating the optical subassembly relative to the support surface as the optical subassembly and probes are moved further toward each other such that the optical subassembly is spatially aligned along the X, Y and Z axes with respect to the test fixture optical axis and the test fixture optical fiber is angularly aligned along $\Theta_X$, $\Theta_Y$, and $\Theta_Z$ with respect to the optics of the optical subassembly; and energizing said at least one metalized region on the optical subassembly to energize said at least one component on the optical subassembly.

11. The method as recited in claim 10, further comprising the step of de-energizing the at least one metalized region on the optical subassembly.

12. The method as recited in claim 10, wherein the step of energizing said at least one metalized region on the optical subassembly further comprises the steps of:

moving a contact into engagement with said at least one metalized region on the optical subassembly; and passing energy through the contact to energize the at least one metalized region, whereby said at least one component on the optical subassembly is energized.

13. The method as recited in claim 10, further comprising the step of assessing the quality of omissions from said at least one energized component on the optical subassembly.

14. The method as recited in claim 13, further comprising the step of indicating acceptance or rejection of the optical subassembly under test based on assessed emissions from said at least one energized component on the optical subassembly.

15. The method as recited in claim 10, further comprising the step of positioning the optical subassembly within a capture zone on the support surface of the test fixture.

* * * * *